3,355,305
INSOLUBILIZATION OF PROTEINS WITH SULFOLANES
Paul M. Westfall, St. Albans, W. Va., assignor to Union Carbide Corporation, a corporation of New York
No Drawing. Filed Sept. 14, 1964, Ser. No. 396,356
12 Claims. (Cl. 106—146)

This invention relates to a method for reducing the water solubility or dispersibility of proteins. More particularly, this invention relates to protein adhesives, especially paper coatings and sizes, and to a method for reducing their sensitivity toward water.

It is well known that the so-called water soluble proteins show adhesive characteristics with respect to a variety of substrates, particularly wood, paper, and textile materials. These adhesives are prepared by dissolving or dispersing the proteins in an aqueous medium, generally a neutral or basic medium, to form a composition which, on application to the substrate and evaporation of the water, leaves a strongly adherent layer of protein on the substrate.

In many applications, particularly paper sizings and coatings, it is desired that the dried adhesive be water-resistant. For example, paper sized with protein adhesives and intended for use in blueprints, maps, currency, bank notes, and the like should not be adversely affected by water present in the atmosphere. Coated paper which is to be printed by the offset process must be resistant to the wetting that occurs during the process, and coated paperboard employed in food packaging should be water-resistant to prevent removal of the coating or distortion of the printed image by water.

Although protein adhesives do develop a certain degree of water resistance on drying, the rate of development is slow, generally taking a week or more and sometimes up to several months, and the resistance that does develop is insufficient for many purposes. As a result, the aqueous protein adhesive compositions generally contain a protein-insolubilizer, which reacts with and crosslinks the protein, thereby rendering the protein resistant to dissolution or dispersion in water. The presently employed insolubilizers, which include aldehydes such as formaldehyde and glyoxal, as well as urea-formaldehyde and melamine-formaldehyde resins, have not been particularly satisfactory. Many react with the protein rapidly when in aqueous medium, resulting in an increased viscosity of the adhesive composition and, in some cases, precipitation of the crosslinked protein. Other insolubilizers adversely affect the color or brightness of protein-coated paper, and still others have rather limited shelf-lives.

It is an object of this invention to provide a novel method for insolubilizing protein.

It is another object of this invention to provide an aqueous protein adhesive composition which on drying rapidly forms a water-resistant bond to the substrate.

It is a further object to provide protein adhesive compositions which do not have rapid increases in viscosity.

A still further object of this invention is to provide an aqueous protein-containing paper-coating composition which does not adversely affect the color or brightness of the coated paper.

These and other objects are obtained by insolubilizing water-soluble proteins with a 3,4-dihalotetrahydrothiophene 1,1-dioxide, hereinafter referred to as 3,4-dihalosulfolane, which is represented by the formula:

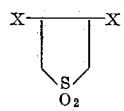

wherein X is a halogen having an atomic number of from 17 to 53, inclusive, i.e., chlorine, bromine, and iodine. 3,4-dichlorotetrahydrothiophene 1,1-dioxide is preferred.

The insolubilization of the adhesives, coatings, and sizings of this invention is effected by contacting in aqueous, basic medium a water-soluble protein with an insolubilizing amount of a 3,4-dihalosulfolane and thereafter removing the water. The mechanism by which the insolubilization is effected is not clearly understood, but it is believed that the dihalosulfolane crosslinks the protein by reaction with amine and/or amide groups present in the protein molecule. The rate of reaction is slow when in aqueous media, such as are employed in adhesive applications, particularly at about room temperature (20 to 25° C.), but on evaporation of the water, good water resistance is readily developed within 3 days or less at room temperature, or in only a few minutes at elevated temperatures. Moreover, paper coatings prepared in accordance with this invention do not adversely affect the brightness or the color of the coated paper.

By the term "water-soluble protein," as employed in this application, is meant a protein which can be dissolved or dispersed in water or aqueous media, such as weak alkali and the like, to form a homogeneous composition which does not readily precipitate. Proteins of this type are well known to the art, and are exemplified by hide glue, bone glue, fish glue and some blood glues, which are soluble in water and soybean protein, some blood glues and casein, which are soluble or can be dispersed into colloidal suspensions in aqueous alkaline media. These proteins may be used singly or in combination with one or more other protein materials. By the term "protein insolubilizer" is meant a compound which, on reaction with a water-soluble protein, reduces the propensity of the protein to go into aqueous solution or dispersion, i.e., reduces the water sensitivity of the water-soluble protein. By the term "insolubilizing" is meant the process by which the protein is rendered resistant to dissolution or dispersion in aqueous media.

The insolubilizing amount of 3,4-dihalosulfolane is not highly critical, and can vary widely depending upon the solubility or dispersibility of the protein and the rate of development and degree of insolubilization desired. In general, amounts of at least about 0.5 weight percent, based on dry protein, are necessary to obtain a noticeable improvement in the degree and rate of development of water resistance, and amounts as high as 25 weight percent or even higher can be employed where rapid development of a high degree of water resistance is desired. Amounts in the range of from about 1 to about 10 weight percent, based on dry protein, are sufficient for most applications, however.

The concentration of protein in the aqueous medium is not critical to this invention, and depends upon the desired degree of fluidity for the particular application. The amount typically ranges from 1 to about 20 weight percent of the aqueous composition.

As indicated above, the aqueous medium should be alkaline, because the reaction of the dihalotetrahydrothiophene 1,1-dioxide is believed to be catalyzed by the presence of base. Since most proteins which are useful as adhesives generally require the presence of base to render them fully soluble or dispersible in water, the environment will generally be basic, i.e., will have a pH of greater than 7. A pH in excess of 11 is impractical because the buffering action of the protein and is too high for use in generally available equipment. For most purposes the pH will range from about 7.5 to about 10, and preferably from about 8 to about 9.5.

Bases which can be employed are the alkali metal and alkaline earth hydroxides such as sodium hydroxide, potassium hydroxide, lithium hydroxide and calcium hydroxide; ammonium hydroxide, and quaternary ammonium hydroxides; hydrolyzable salts of weak acids such as borax, anhydrous sodium carbonate or trisodium phosphate; and organic amines such as alkyl amines, ethanol amines, and morpholine. Preferred bases are those represented by the formula MOH wherein M is a univalent cation having a mass of from 6 to 40, inclusive, i.e., lithium, sodium, potassium, and ammonium.

The contacting of the protein and the dihalosulfolane can be effected in any convenient manner. For example, an aqueous composition containing protein and dihalosulfolane can be prepared and applied to the substrate. Alternatively, aqueous protein can be applied to the substrate and, before or after partial or complete drying, aqueous dihalosulfolane padded or sprayed onto the substrate. This latter procedure is not particularly desirable, however, because it is generally necessary to include base in the aqueous mixture containing dihalosulfolane. The base tends to dehydrohalogenate the dihalosulfolane to form an intermediate which, unless it can react with the protein, will autopolymerize, thereby reducing the efficiency of the dihalosulfolane as an insolubilizer. When the dihalosulfolane is incorporated in the aqueous protein composition, it can be added at any time prior to use of the composition. For example, it can be admixed with the dry protein, or with aqueous protein, either before or after admixing with other ingredients.

The aqueous adhesive compositions which are employed in accordance with this invention may contain other ingredients to modify the properties of the protein adhesives. For example, other adhesive materials, such as starch, butadiene-styrene latexes and the like; pigments such as kaolin clays, titanium dioxide; calcium carbonate and the like; plasticizers such as glycerine, sorbitol, sulfonated oils and the like, et cetera, may be included if desired. A typical paper sizing composition may contain from about 5 to about 15 weight percent of adhesive, at least 20 percent of which is a protein material and the balance of which may be one or more other adhesive materials. A typical paper coating composition contains from about 30 to about 60 weight percent solids, i.e., a pigment plus the adhesive in an amount of from about 5 to about 40, preferably 10 to about 20, weight percent, based upon the weight of the pigment. Again, at least about 20 weight percent of the adhesive is protein and the balance may be one or more other adhesive materials.

The adhesive compositions of this invention are applied to the substrate by techniques known to the art of protein adhesives. It is an advantage of the adhesive compositions of this invention, however, that there is little or no viscosity build-up of the compositions, thus providing compositions having longer pot-lives than the compositions of the prior art.

As indicated above, insolubilization is effected by evaporation of the water from the aqueous environment. The evaporation may occur at room temperature (about 20 to 25° C.) or may be effected at elevated temperature, depending upon the desired degree and rate of development of water resistance. In general, as temperature increases the rate and degree of water resistance increases. Temperatures in the range of from 85° C. to about 135° C. are generally suitable for most commercial applications, and permit the formation of a good degree of water resistance within about 1 to about 3 minutes.

The following examples are illustrative. In these examples, the following tests were employed in evaluating the formulations and paper coatings.

(1) *Viscosity.*—Measured with a Brookfield Model RVF Viscosimeter with spindle No. 3 at 10 r.p.m. and reported in cps.

(2) *Brightness.*—TAPPI standard test method T480m–51.

(3) *Wet-rub resistance.*—Determined by a modified TAPPI RC-184 test method in which a Taber Abraser was employed with a nylon bristle brush replacing the abrasive wheels. In this test a circular coated paper sample was placed in the abraser, immersed in 10 ml. of distilled water, and rotated through 35 revolutions at 72 r.p.m. while in contact with the brush under uniform pressure. The water was placed in a 100-ml. graduate and the sample was flushed with distilled water into the graduate. After adding more distilled water to a total volume of 100 ml. and vigorously agitating to disperse any suspended or dissolved matter, a sample was measured for light transmission at 450 mm.$\mu$ on a Bausch and Lomb "Spectronic 20" spectrometer set to give a reading of 100 percent transmission for distilled water. The degree of water resistance is inversely proportional to the reading obtained, with a value of 100 indicating none of the protein coating had been removed by the test.

*Example 1*

To a dry mixture of 56 grams of delta-protein (a commercially-available protein derived from soybeans) and 1.5 grams of 3,4-dichlorotetrahydrothiophene 1,1-dioxide, was added 194 milliliters of water. After allowing the resulting mixture to soak for 10 minutes to swell the protein particles, 8 grams of 14.8 M ammonium hydroxide was added to disperse the protein. After heating the aqueous mixture to 55° C., with stirring, a sample of the dispersion was placed in a drying pan and heated in a circulating air oven at 115° C. for 3 hours. A second sample, which did not contain the 3,4-dichlorotetrahydrothiophene 1,1-dioxide, was prepared and dried in an identical manner. The films obtained in this manner were placed in test tubes, 7 N ammonium hydroxide was added and the resulting mixture heated on a steam bath for 5 minutes. The sample prepared without the 3,4-dichlorotetrahydrothiophene 1,1-dioxide had completely dissolved, whereas the sample prepared in accordance with this invention was only slightly soluble.

*Example 2*

Several compositions containing varying amounts of 3,4-dichlorotetrahydrothiophene 1,1-dioxide were prepared as follows. A mixture of 8.6 grams of delta-protein and the 3,4-dichlorotetrahydrothiophene 1,1-dioxide in 31 grams of distilled water was soaked for 10 minutes, 1.6 grams of 14.8 M ammonium hydroxide was added and the mixture was heated at 60° C., with stirring, to disperse the protein. The dispersion was added to 141 grams of a predispersed aqueous slurry of No. 2 kaolin clay containing 71 percent solids, and the resulting mixture was thoroughly blended. Each formulation was then coated on each of two paper sheets by hand, using a wire-wound rod, to a weight of 15 pounds per 1000 square feet. One coated sheet was air-dried overnight and the other was oven-dried at 110° C. for 10 minutes. Each sample was then evaluated for wet-rub resistance. The results of these experiments are summarized in tabular form below.

| 3,4-dichlorosulfolane, wt. percent of protein | Wet-rub resistance, percent transmission | |
| --- | --- | --- |
| | Air-dried | Oven-dried |
| 0.0 | 9 | 29 |
| 1.0 | 39 | 42 |
| 3.0 | | 81 |
| 5.0 | 95 | 99 |
| 8.0 | 99 | 99 |

*Example 3*

To a mixture of 18 grams of delta-protein in 82 milliliters of distilled water, which had soaked for 5 minutes, was added 2.16 grams of 14.8 M ammonium hydroxide. After heating the resulting mixture, with stirring, at 60° C. for 30 minutes, the protein dispersion was blended with 141 grams of a predispersed aqueous No. 2 kaolin slurry, and 3,4-dichlorotetrahydrothiophene 1,1-dioxide was added. The resulting formulation was coated on paper as described in Example 2, and the coatings were air-dried. The evaluations of the formulations and the dried coated paper are summarized for different amounts of insolubilizer in tabular form below.

| Insolubilizer, wt. percent of protein | Coating composition | | | Coated paper | | |
|---|---|---|---|---|---|---|
| | Percent solids [1] | pH | Viscosity | Wet-rub resistance | | Brightness |
| | | | | 1 day | 3 days | |
| 0 | 40 | 9.5 | 940 | 24 | 68 | 77 |
| 2 | 40 | 9.3 | 890 | 62 | 96 | 76.5 |
| 3 | 40 | 9.3 | 900 | 82 | 96.5 | 77 |
| 5 | 40 | 9.2 | 910 | 95 | 100 | 77 |
| 8 | 40 | 9.1 | 930 | 99 | 100 | 76.5 |

[1] Solids include clay plus protein.

From the above data it can be seen that 3,4-dichlorotetrahydrothiophene 1,1-dioxide permits the achievement of a high degree of water resistance without adversely affecting the viscosity of the aqueous protein composition or the brightness of the resulting coating.

*Example 4*

Employing apparatus, procedures, and amounts identical to those described in Example 3, except that casein was substituted for the delta-protein, several paper coatings were made at levels of 3,4-dichlorotetrahydrothiophene 1,1-dioxide concentration varying from 2 to 8 weight percent, based on dry protein. In all cases, the coatings containing the 3,4-dichlorotetrahydrothiophene 1,1-dioxide had better wet-rub resistance than the coating without the insolubilizer, but neither the viscosity of the formulation nor the brightness of the coating were adversely affected.

What is claimed is:

1. The method for insolubilizing water-soluble protein which comprises contacting said protein with a 3,4-dihalotetrahydrothiophene 1,1-dioxide, each of whose halogen atoms has an atomic number of from 17 to 53, inclusive, in an aqueous medium having a pH of from about 7.5 to about 10 and thereafter evaporating the water from said aqueous medium.

2. The method for insolubilizing water-soluble protein which comprises contacting said protein with 3,4-dichlorotetrahydrothiophene 1,1-dioxide in an aqueous medium having a pH of from about 7.5 to about 10 and thereafter evaporating the water from said aqueous medium.

3. An adhesive composition comprising an aqueous medium containing a water-soluble protein and a 3,4-dihalotetrahydrothiophene 1,1-dioxide, each of whose halogen atoms has an atomic number of from 17 to 53, inclusive, in an amount sufficient to insolubilize said protein, said composition having a pH of from about 7.5 to about 10.

4. An adhesive composition comprising an aqueous medium containing a water-soluble protein and 3,4-dichlorotetrahydrothiophene 1,1-dioxide in an amount sufficient to insolubilize said protein, said composition having a pH of from about 7.5 to about 10.

5. The method for sizing paper which comprises impregnating paper with an aqueous medium containing a water-soluble protein and a 3,4-dihalotetrahydrothiophene 1,1-dioxide, each of whose halogen atoms has an atomic number of from 17 to 53, inclusive, in an amount sufficient to insolubilize said protein at a pH of from about 7.5 to about 10 and thereafter evaporating water from said impregnated paper.

6. The sized paper produced by the process of claim 5.

7. The method for sizing paper which comprises impregnating paper with an aqueous medium containing a water-soluble protein and 3,4-dichlorotetrahydrothiophene 1,1-dioxide in an amount sufficient to insolubilize said protein at a pH of from about 7.5 to about 10 and thereafter evaporating water from said impregnated paper.

8. The sized paper produced by the process of claim 7.

9. The method for coating paper which comprises coating a side of said paper with a composition comprising an aqueous medium containing a water-soluble protein and a 3,4-dihalotetrahydrothiophene 1,1-dioxide, each of whose halogen atoms has an atomic number of from 17 to 53, inclusive, in an amount sufficient to insolubilize said protein, said composition having a pH of from about 7.5 to about 10, and thereafter evaporating the water from said coated paper.

10. The coated paper produced by the process of claim 9.

11. The method for coating paper which comprises coating a side of said paper with a composition comprising an aqueous medium containing a water-soluble protein and 3,4-dichlorotetrahydrothiophene 1,1-dioxide in an amount sufficient to insolubilize said protein, said composition having a pH of from about 7.5 to about 10, and thereafter evaporating the water from said coated paper.

12. The coated paper produced by the process of claim 11.

References Cited

UNITED STATES PATENTS 2,937,972  5/1960  Bluestone et al. _____ 260—332.1
3,056,723  10/1962  Galloway _____ 167—42
3,306,912  2/1967  Fritz et al. _____ 260—332.1

ALEXANDER H. BRODMERKEL, *Primary Examiner.*

T. MORRIS, *Assistant Examiner.*